(12) United States Patent
Yagihashi et al.

(10) Patent No.: US 9,803,138 B2
(45) Date of Patent: Oct. 31, 2017

(54) FLUORESCENT SUBSTANCE AND PRODUCTION METHOD THEREOF

(71) Applicant: Dexerials Corporation, Tochigi (JP)

(72) Inventors: Kazuhiro Yagihashi, Tochigi (JP); Tsuneo Kusunoki, Tochigi (JP); Masahide Daimon, Tochigi (JP); Yu Nomura, Tochigi (JP); Shuji Ohashi, Tochigi (JP)

(73) Assignee: DEXERIALS CORPORATION, Tokyo (JP)

( * ) Notice: Subject to any disclaimer, the term of this patent is extended or adjusted under 35 U.S.C. 154(b) by 167 days.

(21) Appl. No.: 14/806,391

(22) Filed: Jul. 22, 2015

(65) Prior Publication Data

US 2016/0032184 A1  Feb. 4, 2016

(30) Foreign Application Priority Data

Jul. 29, 2014 (JP) ................. 2014-154149
Dec. 16, 2014 (JP) ................. 2014-253679

(51) Int. Cl.
*C09K 11/00* (2006.01)
*C09K 11/88* (2006.01)
*C09K 11/02* (2006.01)

(52) U.S. Cl.
CPC .......... *C09K 11/886* (2013.01); *C09K 11/025* (2013.01)

(58) Field of Classification Search
CPC ........................ C09K 11/025; C09K 11/886
See application file for complete search history.

(56) References Cited

FOREIGN PATENT DOCUMENTS

| JP | 58-125781 | * | 7/1983 |
|---|---|---|---|
| JP | 58-125781 A | | 7/1983 |
| JP | 63-216291 A | | 9/1988 |
| JP | 2008-308510 A | | 12/2008 |

* cited by examiner

*Primary Examiner* — Carol M Koslow
(74) *Attorney, Agent, or Firm* — Buchanan, Ingersoll & Rooney PC (57) ABSTRACT

A fluorescent substance, represented by the following general formula (1):

$$Ca_{1-x}(Se_yS_{1-y}):Eu_x \qquad (1)$$

where y is a value in the range of 0.5 to 1, wherein an absolute value of a difference between an optimal value (nm) of an emission peak wavelength corresponding to the value of y, and a measured value (nm) of the emission peak wavelength is 5 nm or less, and wherein an absolute value of a difference between an optimal value (nm) of a full width at half maximum of emission corresponding to the value of y, and a measured value (nm) of the full width at half maximum of emission is 6 nm or less.

16 Claims, 2 Drawing Sheets

FLUORESCENT SUBSTANCE AND PRODUCTION METHOD THEREOF

BACKGROUND OF THE INVENTION

Field of the Invention

The present invention relates to a fluorescent substance, and a production method of the fluorescent substance.

Description of the Related Art

Recently, a mainstream of fluorescent excitation light using blue LED has been white light realized by combining blue LED and a yellow fluorescent substance. However, it lacks a red color component, and has poor color rendition. In order to improve color rendition, a combination of a green fluorescent substance and a red fluorescent substance is typically used. As for the red fluorescent substance, a fluorescent substance that can control a wavelength in the red color region, and has a narrow half width. However, a fluorescent substance that can be used on practice has not been known among red fluorescent substances.

A CaS:Eu-based fluorescent substance has a relative narrow half width of emission, exhibits deep red, and can realize a wide color range. Therefore, the CaS:Eu-based fluorescent substance has been noted as a red-light emitting fluorescent substance for blue LED excitation.

For example, disclosed as a red and green fluorescent substance suitable for electron beam excitation is a fluorescent substance represented by the general formula $CaS_{1-x}Se_x:A$ (where A is at least one element selected from the group consisting of Eu and Ce, and x is a value in the range of $0.001 \leq x \leq 0.6$) (see, for example, Japanese Patent Application Laid-Open (JP-A) No. 58-125781).

Figure 1:
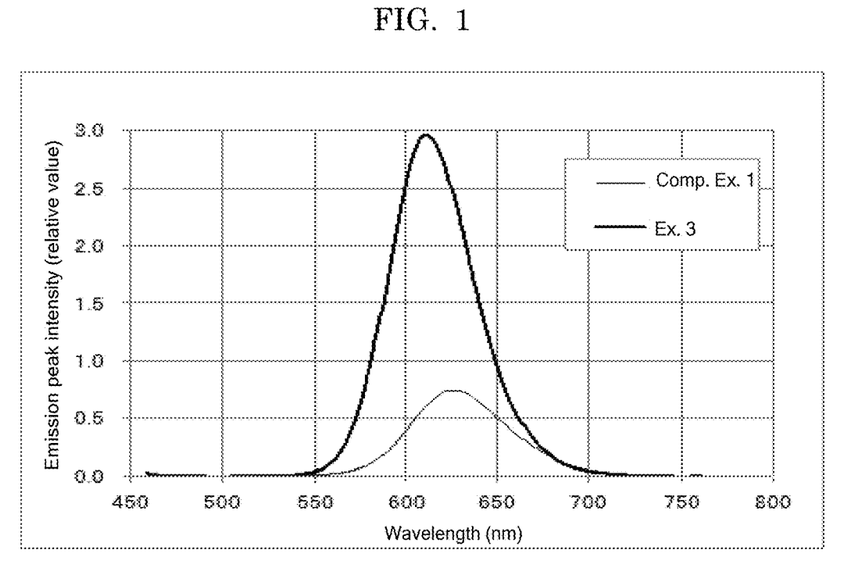
FIG. 1 is a diagram depicting a comparison between the result of Example 3 and the result of Comparative Example 1, in order to demonstrate a change in the shape of the emission spectrum depending on a presence of ammonium chloride.

The disclosed CaS—CaSe mixed crystal-based fluorescent substance (also represented by Ca(Se, S):Eu) forms an all proportional solid solution, and an emission wavelength thereof is monotonously shifted to the shorter wavelength side, as the concentration of Se increases. In the case where an activating agent is Eu, the emission wavelength can be successively controlled in the 590 nm-655 nm band (FIG. 1).

However, it is necessary to further control an emission spectral line shape of the aforementioned fluorescent substance in order to realize practical use thereof. A fluorescent substance having a target emission wavelength, having a narrow full width at half maximum of emission, and having a sharp emission spectral line shape is desired, but the aforementioned disclosed technology has not provided a fluorescent substance having a sufficiently desirable emission spectral line shape.

Moreover, also desired is a fluorescent substance having a desired emission spectral line shape, and excellent characteristics, such as emission peak intensity, internal quantum efficiency, and external quantum efficiency. However, a fluorescent substance that gives excellent results in all of the aforementioned characteristics has not yet been attained.

Moreover, it is necessary to strictly manage a concentration of Se, which is a base of the Ca(Se, S):Eu fluorescent substance, in order to control the emission peak wavelength thereof. In the aforementioned disclose method, the management of the Se concentration is performed by mixing raw materials, CaS and CaSe at the predetermined ratio, and carrying out a heat treatment in a quartz ampoule, or carrying a heat treatment of calcium oxide precursor in a quartz reaction tube with flowing a gas to which $H_2S$ and $H_2Se$ are mixed at the predetermined ratio. However, these methods can treat only a small quantity, and are not suited for industrial use, as $H_2Se$ gas, which is toxic specialty material gas, is used.

In order to industrialize a Ca(Se, S):Eu fluorescent substance, desired is a production method, which can produce a large quantity without using any special process, and is inexpensive.

SUMMARY OF THE INVENTION

The present invention aims to solve the aforementioned various problems in the art, and achieve the following object. Namely, the object of the present invention is to provide a fluorescent substance that has a target emission wavelength, has a narrow full width at half maximum of emission, gives a sharp emission spectral line shape, has a high emission peak intensity, and has high internal quantum efficiency and external quantum efficiency.

Moreover, another object of the present invention is to provide a production method of a fluorescent substance, which is a production method of the aforementioned fluorescent substance, can produce a large quantity without using any special process, and is inexpensive.

The means for solving the aforementioned problems are as follows:

<1> A fluorescent substance, represented by the following general formula (1):

$$Ca_{1-x}(Se_yS_{1-y}):Eu_x \quad (1)$$

where y is a value in the range of 0.5 to 1, wherein an absolute value of a difference between an optimal value (nm) of an emission peak wavelength corresponding to the value of y, and a measured value (nm) of the emission peak wavelength is 5 nm or less, and wherein an absolute value of a difference between an optimal value (nm) of a full width at half maximum of emission corresponding to the value of y, and a measured value (nm) of the full width at half maximum of emission is 6 nm or less.

<2> The fluorescent substance according to <1>, wherein internal quantum efficiency of the fluorescent substance is 45% or greater.

<3> The fluorescent substance according to <1> or <2>, wherein the fluorescent substance represented by the general formula (1) is europium-containing calcium selenide sulfide, where y is 0.5 or greater but less than 1, and the europium-containing calcium selenide sulfide is produced by mixing calcium selenide, calcium sulfite•europium, and ammonium chloride, and firing a mixture thereof.

<4> The fluorescent substance according to <1> or <2>, wherein the fluorescent substance represented by the general formula (1) is europium-containing calcium selenide, where y is 1, and the europium-containing calcium selenide is produced by mixing calcium selenide, europium oxide, and ammonium chloride, and firing a mixture thereof.

<5> A surface-coated fluorescent substance, containing:
the fluorescent substance according to any one of <1> to <4>; and
a fluororesin coating a surface of the fluorescent substance.

<6> A fluorescent substance, containing:
europium-containing calcium selenide sulfide, represented by the following general formula (2):

$$Ca_{1-x}(Se_yS_{1-y}):Eu_x \quad (2)$$

where y is a value in the range of 0.5 or greater but less than 1, wherein the fluorescent substance is produced by mixing calcium selenide, calcium sulfite•europium, and ammonium chloride, and firing a mixture thereof.

<7> A fluorescent substance, containing:
europium-containing calcium selenide, represented by the following general formula (3):

$$Ca_{1-x}Se:Eu_x \qquad (3)$$

wherein the fluorescent substance is produced by mixing calcium selenide, europium oxide, and ammonium chloride, and firing a mixture thereof.

<8> A production method of a fluorescent substance, containing:
mixing calcium selenide, calcium sulfite•europium, and ammonium chloride, and firing a mixture thereof, to thereby produce a fluorescent substance composed of europium-containing calcium selenide sulfide represented by the following general formula (2):

$$Ca_{1-x}(Se_yS_{1-y}):Eu_x \qquad (2)$$

where y is a value in the range of 0.5 or greater but less than 1.

<9> A production method of a fluorescent substance, containing:
mixing calcium selenide, europium oxide, and ammonium chloride, and firing a mixture thereof, to thereby produce a fluorescent substance composed of europium-containing calcium selenide represented by the following general formula (3):

$$Ca_{1-x}Se:Eu_x \qquad (3)$$

<10> The production method according to <8> or <9>, wherein an atmosphere for the firing is a reducing atmosphere.
<11> The production method according to <10>, wherein the atmosphere for the firing is a 4% hydrogen-containing nitrogen atmosphere.
<12> The production method according to any one of <8> to <11>, wherein an amount of the ammonium chloride is 5% by mass to 40% by mass relative to a total mass of the calcium selenide and the calcium sulfite•europium or a total mass of the calcium selenide and the europium oxide.
<13> A production method of a surface-coated fluorescent substance, comprising:
coating a surface of the fluorescent substance, which is produced by the production method according to any one of <8> to <12> with a fluororesin in a non-aqueous atmosphere.

The present invention can solve the aforementioned various problems in the art, achieve the aforementioned objects, and provide a fluorescent substance that has a target emission wavelength, has a narrow full width at half maximum of emission, gives a sharp emission spectral line shape, has a high emission peak intensity, and has high internal quantum efficiency and external quantum efficiency.

Moreover, the present invention can provide a production method of a fluorescent substance, which can produce a large quantity without using any special process, and is inexpensive.

DETAILED DESCRIPTION OF THE INVENTION (Fluorescent Substance)

The fluorescent substance of the present invention is a fluorescent substance represented by the following general formula (1), where an absolute value of a difference between an optimal value (nm) of an emission peak wavelength corresponding to the value of y, and a measured value (nm) of the emission peak wavelength is 5 nm or less, and an absolute value of a difference between an optimal value (nm) of a full width at half maximum of emission corresponding to the value of y, and a measured value (nm) of the full width at half maximum of emission is 6 nm or less.

$$Ca_{1-x}(Se_yS_{1-y}):Eu_x \qquad (1)$$

In the general formula (1), y is a value in the range of 0.5 to 1.

The fluorescent substance having the aforementioned characteristic exhibits a target emission wavelength, a narrow full width at half maximum of emission, and a sharp emission spectral line shape. Therefore, the fluorescent substance can satisfy a wide color reproducible range, and can be effectively used as a red fluorescent substance applicable for actual use.

The fluorescent substance having the aforementioned characteristics can be obtained by producing in accordance with the production method of the present invention, which is explained later.

The present inventors produced a fluorescent substance composed of europium-containing calcium selenide sulfide using calcium sulfide•europium as a sulfur raw material as disclosed in JP-A No. 58-125781 described in the description of the related art, and measured an emission spectrum of the fluorescent substance. As a result, the fluorescent substance did not exhibit the desired emission spectral line shape required by the present inventors (see Comparative Example 2 described later).

Therefore, the present inventors have researched about a concentration of Se, a sulfur raw material, and a sintering aid. As a result, it has been confirmed that a fluorescent substance represented by the general formula (1) produced by mixing calcium selenide, calcium sulfite•europium and ammonium chloride, and firing a mixture thereof, in the case where the fluorescent substance represented by the general formula (1) is europium-containing calcium selenide sulfide where y is 0.5 or greater but less than 1, or the fluorescent substance represented by the general formula (1) produced by mixing calcium selenide, europium oxide, and ammonium chloride, and firing the mixture, in the case where the fluorescent substance represented by the general formula (1) is europium-containing calcium selenide where y is 1, can exhibit a target emission wavelength, a narrow full width at half maximum of emission, and a sharp emission spectral line shape.

In the present invention, an optimal value (nm) of an emission peak wavelength corresponding to a value of y in the general formula (1) monotonically change between CaS:Eu(y=0):654 nm, and CaSe:Eu(y=1):600 nm, and is shorter as y is greater.

In Table 1 below, optimal values in the aforementioned cases of y=0, and 1, and optimal values in cases of y=0.25, 0.5, 0.75, and 0.9 as typical points are presented. As for an optimal value corresponding to y when y is the value other than those depicted in the table, such an optimal value can be determined from a line graph prepared by plotting the optimal values depicted in Table 1, and connecting the plotted points.

TABLE 1

| Peak wavelength theoretical value | $Ca(Se_yS_{1-y})$: Eu |
|---|---|
| 654 nm | CaS: Eu (y = 0) |
| 637 nm | $Ca(Se_{0.25}S_{0.75})$: Eu (y = 0.25) |
| 625 nm | $Ca(Se_{0.5}S_{0.5})$: Eu (y = 0.5) |
| 612 nm | $Ca(Se_{0.75}S_{0.25})$: Eu (y = 0.75) |
| 606 nm | $Ca(Se_{0.9}S_{0.1})$: Eu (y = 0.9) |
| 600 nm | CaSe: Eu (y = 1) |

In the present invention, moreover, an optimal value (nm) of a full width at half maximum of emission corresponding to a value of y in the general formula (1) changes monotonically between CaS:Eu (y=0):65 nm and CaSe:Eu (y=1): 50 nm, and becomes narrower, as y increases.

In Table 2 below, optimal values in the aforementioned cases of y=0 and 1, and optimal values in cases of y=0.25, 0.5, 0.75, 0.9 as typical points are presented. As for an optimal value corresponding to y when y is the value other than those depicted in the table, such an optimal value can be determined from a line graph prepared by plotting the optimal values depicted in Table 2, and connecting the plotted points.

TABLE 2

| Theoretical value of full width at half maximum of emission | $Ca(Se_yS_{1-y})$: Eu |
|---|---|
| 65 nm | CaS: Eu (y = 0) |
| 61 nm | $Ca(Se_{0.25}S_{0.75})$: Eu (y = 0.25) |
| 58 nm | $Ca(Se_{0.5}S_{0.5})$: Eu (y = 0.5) |
| 53 nm | $Ca(Se_{0.75}S_{0.25})$: Eu (y = 0.75) |
| 51 nm | $Ca(Se_{0.9}S_{0.1})$: Eu (y = 0.9) |
| 50 nm | CaSe: Eu (y = 1) |

Various physical properties, such as an emission peak wavelength, full width at half maximum of emission, emission peak intensity, internal quantum efficiency, and external quantum efficiency, are varied depending on a composition or a crystal structure of the fluorescent substance. For example, the fluorescent substance of Comparative Example 2 described later exhibits relatively excellent results in the emission peak intensity, sample absorption rate, or internal quantum efficiency, but the results of the emission peak wavelength and full width at half maximum of emission are not desirable. It is not easy to attain a fluorescent substance that gives excellent results in all of the items.

However, the fluorescent substance of the present invention gives a desired emission spectral line shape, exhibits a high emission peak intensity, and has high internal quantum efficiency and external quantum efficiency, as the fluorescent substance is produced by the production method of the present invention, which is described later. Therefore, the fluorescent substance of the present invention is a fluorescent substance that gives excellent results in all of the aforementioned items.

As with the fluorescent substance of the present invention, an absolute value of a difference between an optical value (nm) of an emission peak wavelength and a measured value (nm) of the emission peak wavelength is more preferably 3 nm or less.

As with the fluorescent substance of the present invention, an absolute value of a difference between an optimal value (nm) of a full width at half maximum of emission, and a measured value (nm) of the full width at half maximum of emission is more preferably 3 nm or less.

Moreover, in the present invention, the emission peak intensity is more preferably 1.5 or greater.

The sample absorption rate is more preferably 60% or greater.

The internal quantum efficiency is more preferably 45% or greater.

Comprehensively considering the results of the comparison test of Examples 7, 9 to 11, and Comparative Example 3 performed with fixing an amount of ammonium chloride, which are described later, in the present invention, a range of y in the general formula (1) is more preferably 0.5 to 0.9. Since particularly excellent results can be attained when y is 0.75, a range of y is even more preferably 0.65 to 0.8, with which a proportion of Se is close to 0.75, the same effect obtainable with the proportion thereof being 0.75 can be expected.

In the present invention, a range of x in the general formula (1) is preferably 0.0001 to 0.1 in view of emission properties, and utilization efficiency of an expensive rare earth material.

When the value of x is less than 0.0001, emission properties applicable for practical use cannot be attained. Although it depends on a production method, a phenomenon of concentration quenching where emission intensity stop increasing as the value of x is increased becomes significant in the range of about 0.01 to about 0.1.

In the present invention, a measurement of an emission spectrum of the fluorescent substance, and calculation of various conversion efficiencies can be performed as described below.

[Measurement of Photoluminescence (PL) Spectrum]

An emission peak wavelength, emission peak intensity, and a full width at half maximum of emission in a PL spectrum can be measured by means of a spectrofluorophotometer FP-6500 (manufactured by JASCO Corporation). The emission peak intensity can be represented as a relative value using PL spectrum data of a typical YAG fluorescent substance P46-Y3 manufactured by Mitsubishi Chemical Corporation, as a standard.

[Calculation of Various Conversion Efficiencies]

As for a conversion efficiency of the fluorescent substance, the efficiency for absorbing excitation light (absorptance), the efficiency for converting the absorbed excitation light to fluorescence (internal quantum efficiency), and the efficiency for converting the excitation light that is a product thereof to fluorescence (external quantum efficiency) are calculated. The emission characteristics are measured by means of a spectrofluorophotometer FP-6500 (manufactured by JASCO Corporation). A dedicated cell is charged with the fluorescent substance powder, followed by irradiating the fluorescent substance powder with blue excitation light having a wavelength of 450 nm to measure a fluorescence spectrum. The quantum efficiencies are calculated from the result thereof using a quantum efficiency calculation software attached with the spectrofluorophotometer.

<Surface-Coated Fluorescent Substance>

As for the more preferred embodiment of the fluorescent substance of the present invention, a surface-coated fluorescent substance, where a surface of the fluorescent substance of the present invention is coated with a fluororesin, is included.

The selenium-based fluorescent substance typically has poor moisture resistance and water resistance, and causes a hydrolysis reaction due to water. If it is decomposed into water, for example, the fluorescent substance is dissolved to become metal selenium, hence losing emission properties.

Therefore, it is desired that a selenium-based fluorescent substance presents deterioration due to hydrolysis, desirably presents deterioration of emission properties, and has excellent storage stability where the emission properties can be maintained over a long period.

The present inventors have found that the deterioration of the fluorescent substance due to hydrolysis or the like can be prevented, deterioration of emission properties, such as emission peak intensity, can be prevented, and the excellent emission properties of the fluorescent substance of the present invention can be maintained over a long period by coating a surface of the fluorescent substance with a fluororesin.

The surface-coated fluorescent substance has improved moisture resistance, can prevent deterioration of excellent emission properties exhibited by the fluorescent substance, and has excellent storage stability where the emission properties can be maintained over a long period.

(Production Method of Fluorescent Substance)

In the case where the fluorescent substance represented by the general formula (1) is europium-containing calcium selenide sulfide, with which y is 0.5 or greater but less than 1, i.e., europium-containing calcium selenide sulfide represented by the following general formula (2), the production method of a fluorescent substance of the present invention is a method containing mixing calcium selenide, calcium sulfite•europium, and ammonium chloride, and firing a mixture thereof to thereby produce a fluorescent substance composed of europium-containing calcium selenide sulfide.

$$Ca_{1-x}(Se_yS_{1-y}):Eu_x \quad (2)$$

In the general formula (2), y is a value in the range of 0.5 or greater but less than 1.

In the case where the fluorescent substance represented by the general formula (1) is europium-containing calcium selenide, with which y is 1, i.e., europium-containing calcium selenide represented by the following general formula (3), the production method of a fluorescent substance of the present invention is a method containing mixing calcium selenide, europium oxide, and ammonium chloride, and firing the mixture, to thereby produce a fluorescent substance composed of europium-containing calcium selenide.

$$Ca_{1-x}Se:Eu_x \quad (3)$$

According to the aforementioned production methods, a fluorescent substance having a target emission wavelength, narrow half width, high emission intensity, and high internal quantum efficiency and external quantum efficiency can be produced.

Moreover, the aforementioned production methods can produce a fluorescent substance in an atmospheric tube furnace of a simple structure at an industrial scale with low cost, without using a special process, and with excellent reproducibility.

<Firing Conditions>

The atmosphere for the firing is preferably a reducing atmosphere.

Moreover, examples of the atmosphere include a 4% $H_2$-containing $N_2$ atmosphere, and a $H_2S$ atmosphere. It is more preferred that the firing be performed in the 4% $H_2$-containing $N_2$ atmosphere.

In the present invention, ammonium chloride is used as a sintering aid.

An amount of the ammonium chloride for use is preferably 5% by mass to 40% by mass, more preferably 5% by mass to 30% by mass, relative to a total mass of the calcium selenide and the calcium sulfite•europium, or a total mass of the calcium selenide and the europium oxide.

<Production Method of Surface-Coated Fluorescent Substance>

A production method of the surface-coated fluorescent substance contains a coating step, which contains coating a surface of the fluorescent substance of the present invention obtained by the firing, with a fluororesin.

The coating step may be coating with a fluororesin in a non-aqueous atmosphere.

For example, a fluororesin solution containing a fluororesin is used as a solvent containing fluorine (e.g., hydrofluoroether, such as ethoxy nonafluorobutane), the fluorescent substance of the present invention obtained in the aforementioned manner is added to the fluororesin solution, and the resulting mixture is mixed by a mix rotor etc. Subsequently, a powder is collected from the mixture by vacuum filtration, and the powder is dried for 0.5 hours to 1.5 hours at the temperature in the range of about 80° C. to about 100° C. In this manner, a surface-coated fluorescent substance, in which a surface of the fluorescent substance is coated with a fluororesin, can be attained.

EXAMPLES

The present invention is more specifically explained through examples and comparative examples, but the present invention is not limited to the examples. In the following examples, measurements of emission (photoluminescence) spectrums, calculation of each conversion efficiency, and evaluations of crystallinity were performed as described below.

[Measurement of Photoluminescence (PL) Spectrum]

An emission peak wavelength, emission peak intensity, and a full width at half maximum of emission in a PL spectrum was measured by means of a spectrofluorophotometer FP-6500 (manufactured by JASCO Corporation). The emission peak intensity was represented as a relative value using PL spectrum data of a typical YAG fluorescent substance P46-Y3 manufactured by Mitsubishi Chemical Corporation, as a standard.

[Calculation of Various Conversion Efficiencies]

As for a conversion efficiency of the fluorescent substance, the efficiency for absorbing excitation light (absorptance), the efficiency for converting the absorbed excitation light to fluorescence (internal quantum efficiency), and the efficiency for converting the excitation light that is a product thereof to fluorescence (external quantum efficiency) were calculated. The emission characteristics were measured by means of a spectrofluorophotometer FP-6500 (manufactured by JASCO Corporation). A dedicated cell was charged with the fluorescent substance powder, followed by irradiating the fluorescent substance powder with blue excitation light having a wavelength of 450 nm to measure a fluorescence spectrum. The quantum efficiencies were calculated from the result thereof using a quantum efficiency calculation software attached with the spectrofluorophotometer.

[Evaluation of Crystallinity]

The evaluation of crystallinity was performed by X-ray diffraction spectroscopy. A diffraction peak position (2θ) and a half width on a CuKα X-ray diffraction (XRD) pattern were measured by means of a powder X-ray diffractometer (X'Pert PRO, manufactured by PANalytical). Moreover, a lattice constant was calculated from a position of a diffraction peak of the strongest line (200) plane of calcium selenide (CaSe).

—Evaluation Standard of Emission Peak Wavelength—

An optimal value of the emission peak wavelength presumed based on Table 1 was determined from a target composition. A case where a difference between the measured value of the emission peak wavelength and the optimal value of the emission peak wavelength was 3 nm or less was evaluated as A; a case where the difference was greater than 3 nm but 5 nm or less was evaluated as B; and a case where the difference was greater than 5 nm was evaluated as C.

—Evaluation Standard of Full Width at Half Maximum of Emission—

An optimal value of a full width at half maximum of emission presumed based on Table 2 was determined from a target composition. A case where the measured value of the full width at half maximum of emission and the optimal value of the full width at half maximum of emission was 3 nm or less was evaluated as A; a case where the difference was greater than 3 nm but 6 nm or less was evaluated as B; and a case where the difference was greater than 6 nm was evaluated as C.

Example 1

In Example 1, europium-containing calcium selenide sulfide, which was red-light emitting fluorescent substance particles, was obtained by mixing a calcium selenide powder, and a calcium sulfite•europium powder, adding ammonium chloride serving as a sintering aid to the mixture, and firing the mixture in a 4% $H_2$-containing $N_2$ atmosphere.

The fluorescent substance of Example 1 was europium-containing calcium selenide sulfide, which was represented by the compositional formula $Ca_{0.997}(Se_{0.75}S_{0.25}):Eu_{0.003}$ (x=0.003, y=0.75 in the general formula (1)), where a proportion of Eu was 0.3 mol %, a proportion of Se was 75 mol %, and a proportion of S was 25 mol %.

First, a calcium sulfite•europium powder for use in Example 1 was obtained by a wet method (i.e., a method for generating a starting material in a liquid phase). In Example 1, calcium sulfite containing 1.2 mol % (which was a value determined by multiplying the proportion of Eu, 0.3 mol %, with 4.0 (1/0.25=4.0)) of Eu was produced as a proportion of S was 25 mol %.

$Ca(NO_3)_2 \cdot 4H_2O$ (manufactured by Kojundo Chemical Lab. Co., Ltd., purity: 2N), $Eu(NO_3)_3 \cdot nH_2O$ (manufactured by Sin-Etsu Chemical Co., Ltd., purity: 3N, n=6.06), and ammonium sulfite monohydrate (manufactured by KANTO CHEMICAL CO., INC., first grade set by the manufacturer (equivalent to JIS first grade product)) were provided.

Subsequently, a weight of each raw material was calculated so that it was to be 5.0 mol with the composition ratio of Ca:Eu=98.8:1.2. To 2,500 mL pure water in a 10 L flask, 26.797 g of the europium compound [$Eu(NO_3)_3 \cdot nH_2O$], and 1,166.59 g of the calcium compound [$Ca(NO_3)_2 \cdot 4H_2O$] were added. The mixture was sufficiently stirred until all the compounds dissolved. In this manner, a mixed solution containing the europium compound and the calcium compound was obtained.

Subsequently, 774.34 g of ammonium sulfite monohydrate, which had the molar number 1.15 times the total molar numbers of Ca and Eu, was added to 1,736 mL of pure water. The mixture was sufficiently stirred until everything dissolved, to thereby prepare a sulfite solution. The sulfite solution was dripped in the previously prepared mixed solution of the Ca compound and the Eu compound, to thereby obtain precipitates.

The precipitates contained Ca and Eu. More specifically, the precipitates were europium•calcium sulfite powder. The precipitates were washed with pure water, followed by filtering, until the conductivity thereof was to be 0.1 mS/cm or lower. Thereafter, the resultant was dried for 20 hours at 120° C. The dried product was then passed through a nylon mesh having a nominal opening of 100 μm, to thereby obtain a powder containing europium and calcium, more specifically a europium•calcium sulfite powder [a powder composed of $(Ca, Eu)SO_3$].

Subsequently, a calcium selenide powder (manufactured by Mitsuwa Chemical Co., Ltd., purity: 2N) and an ammonium chloride powder (manufactured by KANTO CHEMICAL CO., INC., JIS special grade, purity: 98.5% or higher) were provided.

Subsequently, weights of the europium•calcium sulfite powder and the calcium selenide powder were calculated so that they were to be 0.0056 mol with the molar composition ratio represented by x=0.003, and y=0.75 (i.e., a proportion of Eu was 0.3 mol %, a proportion of Se was 75 mol %, and a proportion of S was 25 mol %). Moreover, a weight of the ammonium chloride powder was calculated so that it was to be 5% by mass relative to a total mass of the europium•calcium sulfite powder and the calcium selenide powder. Each weight of the europium•calcium sulfite powder, the calcium selenide powder, and the ammonium chloride powder in Example 1 is depicted in Table 3.

In Example 1, 0.168 g of the above-obtained europium•calcium sulfite ($CaSO_3$:Eu) powder, 0.50 g of the calcium selenide (CaSe), and 0.033 g of the ammonium chloride ($NH_4Cl$) were weighed, and mixed.

The amount of ammonium chloride was set to 0.033 g, which was 5% of 0.668 g that was a sum of 0.168 g of the europium•calcium sulfite powder, and 0.50 g of calcium selenide.

Subsequently, an aluminum firing boat was charged with the powder mixture, and then the powder mixture was fired by an electric furnace. The firing conditions were as follows. Specifically, the temperature was increased to 950° C. over 1.55 hours, then the temperature was maintained at 950° C. for 1.5 hours, followed by cooling to room temperature over 2 hours. During the firing, 4% $H_2$-containing $N_2$ gas was introduced in the electric furnace at the rate of 0.3 L/min.

Thereafter, the resultant was lightly ground by an agate mortar, to thereby obtain a red-light emitting fluorescent substance composed of $Ca_{0.997}(Se_{0.75}S_{0.25}):Eu_{0.003}$.

The emission peak wavelength, full width at half maximum of emission, emission peak intensity, sample absorption rate, internal quantum efficiency, external quantum efficiency of the red-light emitting fluorescent substance particle sample of Example 1 were evaluated.

The material input specification of the red-light emitting fluorescent substance particle sample of Example 1 is depicted in Table 3, and the evaluation results of the emission peak wavelength, full width at half maximum of emission, emission peak intensity, sample absorption rate, internal quantum efficiency, and external quantum efficiency are depicted in Table 4.

Examples 2 to 8

Red-light emitting fluorescent substance particle samples of Examples 2 to 8, each composed of $Ca_{0.997}(Se_{0.75}S_{0.25}):Eu_{0.003}$, were obtained in the same manner as in Example 1, provided that the amount of ammonium chloride was changed as depicted in Table 3.

In the same manner as in Example 1, the red-light emitting fluorescent substance particle samples of Examples 2 to 8 were evaluated in terms of an emission peak wavelength, full width at half maximum of emission, emission peak intensity, sample absorption rate, internal quantum efficiency, and external quantum efficiency. The evaluation results are presented in Table 4.

Note that, an evaluation of crystallinity was also performed on Example 7. The evaluation results are presented in Table 5.

Comparative Example 1

In Comparative Example 1, red-light emitting fluorescent substance particles were obtained by a production method, in which ammonium chloride is not added.

Europium-containing calcium selenide sulfide was obtained in the same manner as in Example 1, provided that ammonium chloride was not added. Specifically, the europium-containing calcium selenide sulfide was obtained by mixing a calcium selenide powder and a calcium sulfite•europium powder at the ratio depicted in Table 3, and firing the mixture in the $N_2$ atmosphere containing 4% $H_2$.

In the same manner as in Example 1, the red-light emitting fluorescent substance particle sample of Comparative Example 1 was evaluated in terms of an emission peak wavelength, full width at half maximum of emission, emission peak intensity, sample absorption rate, internal quantum efficiency, and external quantum efficiency. The evaluation results are presented in Table 4.

Comparison Between Examples 1 to 8 and Comparative Example 1

How the presence of ammonium chloride as a sintering aid affected was confirmed by comparing Examples 1 to 8 with Comparative Example 1. The result of Comparative Example 1, in which the amount of the ammonium chloride added was 0% by mass, and the results of Examples 1 to 8 are compared (see the results in Table 4).

A change in the shape of the emission spectrum depending on the presence of ammonium chloride (Example 3 and Comparative Example 1) is depicted in FIG. 1.

Figure 2:
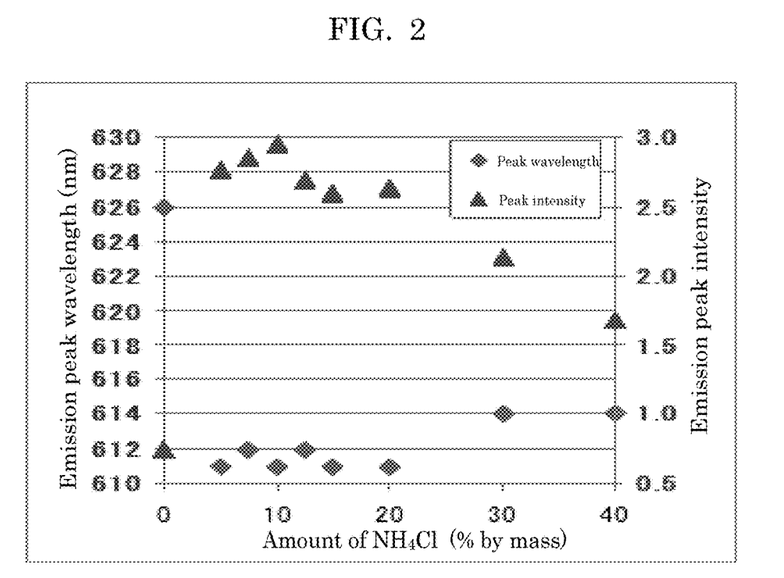
FIG. 2 is a diagram depicting a comparison between the results of Examples 1 to 8 and Comparative Example 1, in order to demonstrate changes in the emission peak wavelength and emission peak intensity depending on an amount of ammonium chloride added.

Changes in the emission peak wavelength and the emission peak intensity according to the amount of ammonium chloride are depicted in FIG. 2.

It can be confirmed that the emission peak wavelength is 626 nm in Comparative Example 1 (the amount of the ammonium chloride added: 0% by mass), but the emission peak wavelength can be shifted to the short wavelength side, i.e., 611 nm to 614 nm in Examples 1 to 8 (the amount of the ammonium chloride added: 5% by mass to 40% by mass). Moreover, the full width at half maximum of emission is 61.0 nm in Comparative Example 1, but the full width at half maximum of emission can be narrowed, i.e., 52.2 nm to 58.0 nm, in Examples 1 to 8. As described here, it can be confirmed that the shape of the emission spectrum is largely changed depending on the presence of the ammonium chloride (Table 4, FIG. 1).

The emission peak intensity is 0.74 in Comparative Example 1. Among Examples 1 to 8, the emission peak intensity in Example 8, where the amount of $NH_4Cl$ added is large, is 1.68, and the result is slightly poor compared to other Examples, but is significantly better than Comparative Example 1. In the other Examples 1 to 7, the values of the emission peak intensity are significantly increased, i.e., 2.14 to 2.95.

Moreover, the internal quantum efficiency is 27.1% in Comparative Example 1. Among Examples 1 to 8, the internal quantum efficiency in Example 8 is 53.1%, and the result is slightly poor compared to other Examples, but is significantly better than Comparative Example 1. In the other Examples 1 to 7, the values of the internal quantum efficiency are significantly increased, i.e., 59.4% to 72.6%.

As described above, it can be confirmed that the emission peak intensity (height of the emission spectrum) is largely changed depending on the presence of the ammonium chloride (FIGS. 1 and 2). Moreover, it can be confirmed from the results of Examples 1 to 8 compared to the result of Comparative Example 1 that the fluorescent substance of the present invention exhibits an excellent emission spectral line shape, and gives excellent results in other physical properties, such as emission peak intensity, and internal quantum efficiency (Table 4, and FIGS. 1 and 2).

Note that, it is also understood from changes in the emission peak wavelength and the emission peak intensity depending on the amount of the ammonium chloride depicted in FIG. 2 that the emission peak intensity reduces, and the emission peak wavelength tends to slightly sift to the longer wavelength side, as the amount of the ammonium chloride added is greater than 30% by mass.

By adding ammonium chloride, a liquid phase can be formed at low temperature, hence an effect of preventing transpiration of Se can be expected. In the production of europium-containing calcium selenide sulfide in Examples, it can be confirmed that it is possible in the range of about 5% by mass to 40% by mass to produce a fluorescent substance having a target emission peak wavelength, having a narrow full width at half maximum of emission, high emission peak intensity, and high internal quantum efficiency.

Example 9

In Example 9, europium-containing calcium selenide sulfide was obtained in the same manner as in Examples 1 to 8 by mixing a calcium selenide powder and a calcium sulfite•europium powder, adding ammonium chloride as a sintering aid, and firing the mixture in a $N_2$ atmosphere containing 4% $H_2$.

The fluorescent substance of Example 9 was europium-containing calcium selenide sulfide, which was represented by the compositional formula $Ca_{0.997}(Se_{0.5}S_{0.5}):Eu_{0.003}$ (x=0.003, y=0.5 in the general formula (1)), where a proportion of Eu was 0.3 mol %, a proportion of Se was 50 mol %, and a proportion of S was 50 mol %.

First, a calcium sulfite•europium powder for use in Example 9 was obtained by a wet method, in the same manner as in Examples 1 to 8. In Example 9, calcium sulfite containing 0.6 mol % (which was a value determined by multiplying the proportion of Eu, 0.3 mol %, with 2.0 (1/0.5=2.0)) of Eu was produced, as a proportion of S was 50 mol %.

Subsequently, 0.404 g of the above-obtained europium•calcium sulfite (CaSO$_3$:Eu) powder, 0.400 g of the calcium selenide (CaSe), and 0.241 g (30% by mass) of the ammonium chloride (NH$_4$Cl) were weighed and mixed as depicted in Table 3, in the same manner as in Example 1.

Subsequently, the mixture was fired, and ground in the same manner as in Examples 1 to 8, to thereby obtain a red-light emitting fluorescent substance particle sample composed of Ca$_{0.997}$(Se$_{0.5}$S$_{0.5}$):Eu$_{0.003}$.

In the same manner as in Example 1, the red-light emitting fluorescent substance particle sample of Example 9 was evaluated in terms of an emission peak wavelength, full width at half maximum of emission, emission peak intensity, sample absorption rate, internal quantum efficiency, external quantum efficiency, and crystallinity. The evaluation results are presented in Tables 4 and 5.

Example 10

In Example 10, europium-containing calcium selenide sulfide was obtained in the same manner as in Example 9 by mixing a calcium selenide powder and a calcium sulfite•europium powder, adding ammonium chloride as a sintering aid, and firing the mixture in a N$_2$ atmosphere containing 4% H$_2$.

The fluorescent substance of Example 10 was europium-containing calcium selenide sulfide, which was represented by the compositional formula Ca$_{0.997}$(Se$_{0.9}$S$_{0.1}$):Eu$_{0.003}$ (x=0.003, y=0.9 in the general formula (1)), where a proportion of Eu was 0.3 mol %, a proportion of Se was 90 mol %, and a proportion of S was 10 mol %.

First, a calcium sulfite•europium powder for use in Example 10 was obtained by a wet method, in the same manner as in Examples 1 to 8. In Example 10, calcium sulfite containing 3.0 mol % (which was a value determined by multiplying the proportion of Eu, 0.3 mol %, with 10.0 (1/0.1=10.0)) of Eu was produced as a proportion of S was 10 mol %.

Subsequently, 0.078 g of the above-obtained europium•calcium sulfite (CaSO$_3$:Eu) powder, 0.700 g of calcium selenide (CaSe), and 0.234 g (30% by mass) of ammonium chloride (NH$_4$Cl) were weighed and mixed as depicted in Table 3, in the same manner as in Example 1.

Subsequently, the mixture was fired, and ground in the same manner as in Examples 1 to 8, to thereby obtain a red-light emitting fluorescent substance particle sample composed of Ca$_{0.997}$(Se$_{0.9}$S$_{0.1}$):Eu$_{0.003}$.

The emission peak wavelength, full width at half maximum of emission, emission peak intensity, sample absorption rate, internal quantum efficiency, external quantum efficiency, and crystallinity of the red-light emitting fluorescent substance particle sample of Example 10 were evaluated in the same manner as in Example 1. The evaluation results are presented in Tables 4 and 5.

Example 11

In Example 11, europium-containing calcium selenide, which was a red-light emitting fluorescent substance particles, was obtained by missing a calcium selenide powder, and an europium oxide powder, adding ammonium chloride to the mixture as a sintering aid, and firing the mixture in a N$_2$ atmosphere containing 4% H$_2$.

The fluorescent substance of Example 11 was europium-containing calcium selenide, which was represented by the compositional formula Ca$_{0.997}$(Se):Eu$_{0.003}$ (x=0.003, y=1.0 in the general formula (1)), where a proportion of Eu was 0.3 mol %, and a proportion of Se was 100 mol %.

Subsequently, 0.500 g of calcium selenide (CaSe), 0.0022 g of europium oxide (Eu$_2$O$_3$) manufactured by Kojundo Chemical Lab. Co., Ltd., and having purity of 99.9%, and 0.151 g (30% by mass) of ammonium chloride (NH$_4$Cl) were weighed, and mixed as depicted in Table 3, in the same manner as in Example 1.

Subsequently, the mixture was fired and ground in the same manner as in Examples 1 to 8, to thereby obtain a red-light emitting fluorescent substance particle sample composed of Ca$_{0.997}$(Se):Eu$_{0.003}$.

The emission peak wavelength, full width at half maximum of emission, emission peak intensity, sample absorption rate, internal quantum efficiency, external quantum efficiency, and crystallinity of the red-light emitting fluorescent substance particle sample of Example 11 were evaluated in the same manner as in Example 1. The evaluation results are presented in Tables 4 and 5.

Comparative Example 2

In Comparative Example 2, europium-containing calcium selenide sulfide, which was a red-light emitting fluorescent substance particles, was obtained by mixing a calcium selenide powder, a calcium sulfide•europium fluorescent substance powder, adding ammonium chloride to the mixture, and firing the mixture in a N$_2$ atmosphere containing 4% H$_2$.

The fluorescent substance of Comparative Example 2 was europium-containing calcium selenide sulfide, which was represented by the compositional formula Ca$_{0.997}$(Se$_{0.5}$S$_{0.5}$):Eu$_{0.003}$ (x=0.003, y=0.5 in the general formula (1)), where a proportion of Eu was 0.3 mol %, a proportion of Se was 50 mol %, and a proportion of S was 50 mol %.

A method for obtaining the calcium sulfide•europium fluorescent substance powder for use in Comparative Example 2 was as follows.

First, calcium sulfite containing Eu, a proportion of which was 0.6 mol % (which was a value determined by multiplying the proportion of Eu, 0.3 mol %, with 2.0 (1/0.5=2.0)), was produced by a wet method in the same manner as in Example 1, as a proportion of S was 50 mol %.

Subsequently, 2.0 g of the europium sulfite•calcium sulfite powder, and 0.6 g (30% by mass) of ammonium chloride were weighed and mixed.

Subsequently, an aluminum firing boat was charged with the powder mixture, and the powder mixture was fired by an electric furnace. The firing conditions were as follows. Specifically, the temperature was increased to 950° C. over 1.55 hours, then the temperature was maintained at 950° C. for 1.5 hours, followed by cooling to room temperature over 2 hours. During the firing, 4% H$_2$-containing N$_2$ gas was introduced in the electric furnace at the rate of 0.3 L/min. Thereafter, the resultant was sufficiently ground by an agate mortar, to thereby obtain a calcium sulfide•europium fluorescent substance powder.

Subsequently, 0.303 g of the above-obtained calcium sulfide•europium fluorescent substance powder, 0.50 g of calcium selenide, and 0.241 g (30% by mass) of ammonium chloride were weighed, and mixed.

Subsequently, an aluminum firing boat was charged with the powder mixture, and the powder mixture was fired by an electric furnace. The firing conditions were as follows. Specifically, the temperature was increased to 950° C. over 1.55 hours, then the temperature was maintained at 950° C. for 1.5 hours, followed by cooling to room temperature over 2 hours. During the firing, 4% $H_2$-containing $N_2$ gas was introduced in the electric furnace at the rate of 0.3 L/min. Thereafter, the resultant was lightly ground by an agate mortar, to thereby obtain a red-light emitting fluorescent substance particle sample of Comparative Example 2.

The material input specification of the red-light emitting fluorescent substance particle sample of Comparative Example 2 is depicted in Table 3, and the evaluation results of the emission peak wavelength, full width at half maximum of emission, emission peak intensity, sample absorption rate, internal quantum efficiency, and external quantum efficiency are depicted in Table 4.

Comparison Between Example 9 and Comparative Example 2

How the choice of sulfur raw materials, the calcium sulfite•europium powder or the calcium sulfide•europium fluorescent substance powder, affected was confirmed by comparing Example 9 to Comparative Example 2.

In Comparative Example 2, the emission peak intensity, sample absorption rate, and internal quantum efficiency were high, but the emission peak wavelength was significantly shifted to the longer wavelength side, and the full width at half maximum of emission was also widened. The target emission spectral line shape could not be attained, and it was assumed that selenium substitution in the material was impaired. In Example 9 using the calcium sulfite•europium powder as a sulfur raw material, on the other hand, excellent results were attained in all of the emission peak wavelength, full width at half maximum of emission, emission peak intensity, sample absorption rate, internal quantum efficiency, and external quantum efficiency. It is assumed that the excellent fluorescent substance could be produced in Example 9, because a liquid phase could be formed at the lower temperature owing to the high reactivity thereof, compared to Comparative Example 2 using the calcium sulfide•europium fluorescent substance powder, and the effect for preventing transpiration of Se could be expected.

The final product, europium-containing calcium selenide sulfide, was attained by mixing the selenium raw material and the sulfur raw material, and firing the mixture in which the selenium and sulfur raw materials were present together. As the calcium sulfite•europium was used as the sulfur raw material in the firing reaction, the fluorescent substance having a target emission peak wavelength, having a narrow full width at half maximum of emission, having high emission peak intensity, and having high internal quantum efficiency and external quantum efficiency could be produced.

Comparative Example 3

In Comparative Example 3, europium-containing calcium selenide sulfide was obtained in the same manner as in Examples 1 to 8 by mixing a calcium selenide powder, and a calcium sulfite•europium powder, adding ammonium chloride as a sintering aid, and firing the mixture in a $N_2$ atmosphere containing 4% $H_2$.

The fluorescent substance of Comparative Example 3 was europium-containing calcium selenide sulfide, which was represented by the compositional formula $Ca_{0.997}(Se_{0.25}S_{0.75}):Eu_{0.003}$ (x=0.003, y=0.25 in the general formula (1)), where a proportion of Eu was 0.3 mol %, a proportion of Se was 25 mol %, and a proportion of S was 75 mol %.

First, a calcium sulfite•europium powder for use in Comparative Example 3 was obtained by a wet method in the same manner as in Examples 1 to 8. In Comparative Example 3, calcium sulfite containing 0.4 mol % (which was a value determined by multiplying the proportion of Eu, 0.3 mol %, with 1.33 (1/0.75=1.33)) of Eu was produced, as a proportion of S was 75 mol %.

Subsequently, 0.908 g of the above-obtained europium•calcium sulfite ($CaSO_3$:Eu) powder, 0.300 g of the calcium selenide (CaSe), and 0.362 g (30% by mass) of ammonium chloride ($NH_4Cl$) were weighed and mixed as depicted in Table 3, in the same manner as in Example 1.

Subsequently, the mixture was fired, and ground in the same manner as in Examples 1 to 8, to thereby obtain a red-light emitting fluorescent substance particle sample composed of $Ca_{0.997}(Se_{0.25}S_{0.75}):Eu_{0.003}$.

In the same manner as in Example 1, the red-light emitting fluorescent substance particle sample of Comparative Example 3 was evaluated in terms of an emission peak wavelength, full width at half maximum of emission, emission peak intensity, sample absorption rate, internal quantum efficiency, external quantum efficiency, and crystallinity. The evaluation results are presented in Tables 4 and 5.

Comparison Between Examples 7, 9 to 11 and Comparative Example 3

How the change in the ratio of Se affected was confirmed by comparing Examples 7, 9 to 11 with Comparative Example 3.

Figure 3:
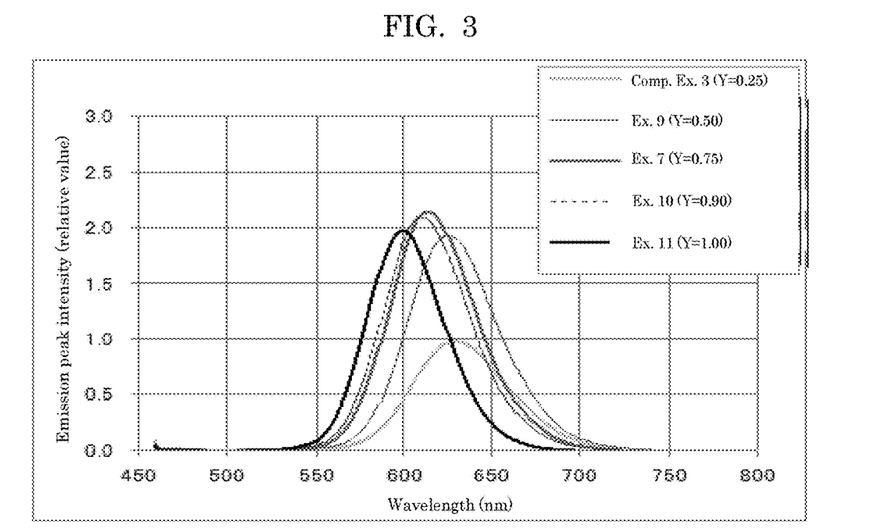
FIG. 3 is a diagram depicting a comparison between Examples 7, 9 to 11, and Comparative Example 3, in order to demonstrate a change in the emission spectrum shape depending on a ratio of Se in the composition of the fluorescent substance.

Examples where a proportion of Se in the fluorescent substance composition was changed (Comparative Example 3 (y=0.25), Example 9 (y=0.5), Example 7 (y=0.75), Example 10 (y=0.90), Example 11 (y=1.00)) with fixing the amount of the ammonium chloride to 30% by mass were compared, and a change in the shape of the emission spectrum in each example was depicted in FIG. 3.

Moreover, the crystallinity evaluation (X-ray diffraction measurement) results of the fluorescent substances of Examples 7 and 9 to 11, Comparative Example 3 (value of y=0.25 to 1.0) are presented in Table 5. As a result of the measurement of the X-ray diffraction pattern, the diffraction peak belonging to the (200) plane was the maximum peak (strongest line) of the X-ray diffraction pattern. The diffraction peak belonging to the (200) plane was appeared at the diffraction angle 2θ=30.23° to 30.85°. The lattice constant determined by the calculation from the diffraction peak position of the (200) plane was in the range of 5.80 Å to 5.91 Å, and tended to increase (increase of lattice spacing) together with the increase in the proportion of Se (the value of y).

Moreover, the half width of the diffraction peak of the (200) plane was 0.104 deg to 0.223 deg. The half width of the diffraction peak was wide, when y=0.5, and tended to be narrow, as it was closer to a monophase.

In Examples 7, 9 to 11, and Comparative Example 3, it could be understood that the emission peak wavelength was shifted to the shorter wavelength side, the full width at half maximum of emission became narrow, and the lattice constant increased, as the proportion of Se increased.

Moreover, it was found from the results of Examples 7, 9 to 11 compared with the result of Comparative Example 3 that the full width at half maximum of emission was narrow, i.e., 50.2 nm to 58.6 nm, the emission peak intensity was high, i.e., 1.93 to 2.14, the internal quantum efficiency was high, i.e., 47.8% to 62.0%, and the external quantum efficiency was high, i.e., 35.9% to 43.6%, when the proportion of Se was in the range of 50% to 100% (0.50≤y≤1.00).

As depicted in Table 5, moreover, the lattice constant was substantially regularly increased together with the increase of the proportion of Se, in the range of y of 0.5 to 1.00. Therefore, it is assumed that this was due to the improvement of the homogeneity of S and Se.

As described above, in the production of the europium-containing calcium selenide sulfide of Examples, it was confirmed that the fluorescent substance having a narrow full width at half maximum of emission, high emission peak intensity, and high internal quantum efficiency and external quantum efficiency with the emission peak wavelength of 600 nm to 625 nm could be produced by adjusting the proportion of Se in the range of 50% to 100%($0.50 \leq y \leq 1.00$).

Comprehensively considering especially the results of Examples 7, 9 to 11 (Tables 4 and 5), the fluorescent substance, where the range of y was 0.5 to 0.9, with which excellent results were obtained in the emission spectral line shape, and external quantum efficiency, was more preferable. Among them, the fluorescent substance where the value of y was 0.75 had excellent results in the emission spectral line shape, and external quantum efficiency, and was particularly preferable.

TABLE 3

| | Material input specification | | Amount of NH$_4$Cl | Weight of raw material (g) | | | | |
|---|---|---|---|---|---|---|---|---|
| | X | Y | (mass %) | CaSe | CaSO$_3$:Eu | NH$_4$Cl | Eu$_2$O$_3$ | CaS:Eu |
| Ex. 1 | 0.003 | 0.75 | 5.0 | 0.50 | 0.168 | 0.033 | — | — |
| Ex. 2 | 0.003 | 0.75 | 7.5 | 0.50 | 0.168 | 0.050 | — | — |
| Ex. 3 | 0.003 | 0.75 | 10.0 | 0.50 | 0.168 | 0.067 | — | — |
| Ex. 4 | 0.003 | 0.75 | 12.5 | 0.50 | 0.168 | 0.084 | — | — |
| Ex. 5 | 0.003 | 0.75 | 15.0 | 0.50 | 0.168 | 0.100 | — | — |
| Ex. 6 | 0.003 | 0.75 | 20.0 | 0.50 | 0.168 | 0.134 | — | — |
| Ex. 7 | 0.003 | 0.75 | 30.0 | 0.50 | 0.168 | 0.200 | — | — |
| Ex. 8 | 0.003 | 0.75 | 40.0 | 0.50 | 0.168 | 0.267 | — | — |
| Ex. 9 | 0.003 | 0.50 | 30.0 | 0.40 | 0.404 | 0.241 | — | — |
| Ex. 10 | 0.003 | 0.90 | 30.0 | 0.70 | 0.078 | 0.234 | — | — |
| Ex. 11 | 0.003 | 1.00 | 30.0 | 0.50 | — | 0.151 | 0.0022 | — |
| Comp. Ex. 1 | 0.003 | 0.75 | 0.0 | 0.50 | 0.168 | 0 | — | — |
| Comp. Ex. 2 | 0.003 | 0.50 | 30.0 | 0.50 | — | 0.241 | — | 0.303 |
| Comp. Ex. 3 | 0.003 | 0.25 | 30.0 | 0.30 | 0.908 | 0.362 | — | — |

TABLE 4

| | Evaluation results of fluorescent substance | | | | | | | |
|---|---|---|---|---|---|---|---|---|
| | Emission peak wavelength | | Full width at half maximum of emission | | Emission peak intensity (relative value) | Sample absorption rate (%) | Internal quantum efficiency (%) | External quantum efficiency (%) |
| | (nm) | Evaluation | (nm) | Evaluation | | | | |
| Ex. 1 | 611 | A | 52.3 | A | 2.76 | 77.7% | 68.8% | 53.4% |
| Ex. 2 | 612 | A | 52.2 | A | 2.86 | 79.2% | 69.8% | 55.3% |
| Ex. 3 | 611 | A | 52.9 | A | 2.95 | 79.4% | 72.6% | 57.6% |
| Ex. 4 | 612 | A | 53.9 | A | 2.69 | 78.2% | 68.3% | 53.4% |
| Ex. 5 | 611 | A | 53.8 | A | 2.59 | 74.9% | 68.3% | 51.2% |
| Ex. 6 | 611 | A | 53.0 | A | 2.62 | 76.0% | 66.7% | 50.7% |
| Ex. 7 | 614 | A | 55.7 | A | 2.14 | 73.5% | 59.4% | 43.6% |
| Ex. 8 | 614 | A | 58.0 | B | 1.68 | 66.1% | 53.1% | 35.1% |
| Ex. 9 | 625 | A | 58.6 | A | 1.93 | 67.8% | 62.0% | 42.0% |
| Ex. 10 | 610 | B | 55.5 | B | 2.10 | 72.3% | 59.6% | 43.1% |
| Ex. 11 | 600 | A | 50.2 | A | 1.97 | 75.2% | 47.8% | 35.9% |
| Comp. Ex. 1 | 626 | C | 61.0 | C | 0.74 | 63.4% | 27.1% | 17.2% |
| Comp. Ex. 2 | 649 | C | 65.0 | C | 2.25 | 76.8% | 68.7% | 52.8% |
| Comp. Ex. 3 | 630 | C | 62.9 | A | 0.98 | 54.9% | 41.5% | 22.8% |

TABLE 5

| | Material input specification | | | Crystallinity evaluation results | | |
|---|---|---|---|---|---|---|
| | X | Y | Amount of NH₄CL (mass %) | Strongest line diffraction peak position 2θ (deg) | Strongest line diffraction peak half width (deg) | Lattice constant (Å) determined by calculation |
| Comp. Ex. 3 | 0.003 | 0.25 | 30 | 30.85 | 0.169 | 5.8 |
| Ex. 9 | 0.003 | 0.5 | 30 | 30.78 | 0.223 | 5.81 |
| Ex. 7 | 0.003 | 0.75 | 30 | 30.45 | 0.176 | 5.86 |
| Ex. 10 | 0.003 | 0.9 | 30 | 30.3 | 0.113 | 5.9 |
| Ex. 11 | 0.003 | 1 | 30 | 30.23 | 0.104 | 5.91 |

Example 12

A plastic container with a cap was charged with 10 g of a fluororesin solution (resin solid content: 2% by mass, Novec 2702 manufactured by 3M), and 2 g of the fluorescent substance obtained in Example 3, and the resulting mixture was dispersed by a vibration mixer for 5 minutes. Subsequently, the resulting dispersion liquid was stirred by a mix rotor for 1 hour. After the stirring, a powder was collected by vacuum filtration, and the collected powder was dried at 80° C. for 1 hour, to thereby obtain a surface-coated fluorescent substance, in which the fluororesin was adsorbed on the fluorescent substance.

The processes mentioned above were carried out in a glove box (20° C., 20% RH).

The above-obtained surface-coated fluorescent substance was subjected to the following environmental tests, to observe a change in the emission peak intensity with time. Each emission peak intensity was measured by means of a spectrofluorophotometer FP-6500 (manufactured by JASCO Corporation).

Environmental Test (A)

The surface-coated fluorescent substance was stored in a desiccator (20° C., 5% RH) for 1 week, to measure a change in the emission peak intensity before and after the storage. Specifically, the test was performed in the following manner.

1. An emission peak intensity of the surface-coated fluorescent substance obtained in Example 12 was measured before storing in a desiccator.
2. A ratio of the emission peak intensity obtained in "1" to the emission peak intensity of the fluorescent substance (no coating process) used in Comparative Example 4 below was determined as "emission peak intensity retention rate before storage" with the emission peak intensity of the fluorescent substance of Comparative Example 4 being 100.

Note that, in all the environmental tests in the present invention, the emission peak intensity retention rate was determined as a ratio by comparing the emission peak intensity of the fluorescent substance of Comparative Example 4, and was determined as a ratio with the emission peak intensity of the fluorescent substance of Comparative Example 4 being 100.

3. Next, the surface-coated fluorescent substance obtained in Example 12 was stored in the desiccator for 1 week, and an emission peak intensity of the surface-coated fluorescent substance was measured after the storage.
4. A ratio of the emission peak intensity obtained in "3" to the emission peak intensity of the fluorescent substance of Comparative Example 4 was determined as "emission peak intensity retention rate after 1 week storage."

The obtained results are presented in the following table 6.

Environmental Test (B)

A change in the emission peak intensity over time was measured by storing the surface-coated fluorescent substance in a glove box (20° C., 20% RH). Specifically, the test was performed in the following manner.

1. An emission peak intensity of the surface-coated fluorescent substance obtained in Example 12 was measured before storing in a glove box (number of storage days: 0).
2. A ratio (emission peak intensity retention rate) of the emission peak intensity obtained in "1" to the emission peak intensity of the fluorescent substance of Comparative Example 4 was determined.
3. Next, the surface-coated fluorescent substance obtained in Example 12 was stored in the glove box for 3 days, 14 days, and 21 days. An emission peak intensity of the surface-coated fluorescent substance after being stored for 3 days, 14 days, or 21 days was measured.
4. A ratio (emission peak intensity retention rate) of each emission peak intensity after storing 3 days, 24 days, or 21 days obtained in "3" to the emission peak intensity of the fluorescent substance of Comparative Example 4.

Figure 4:
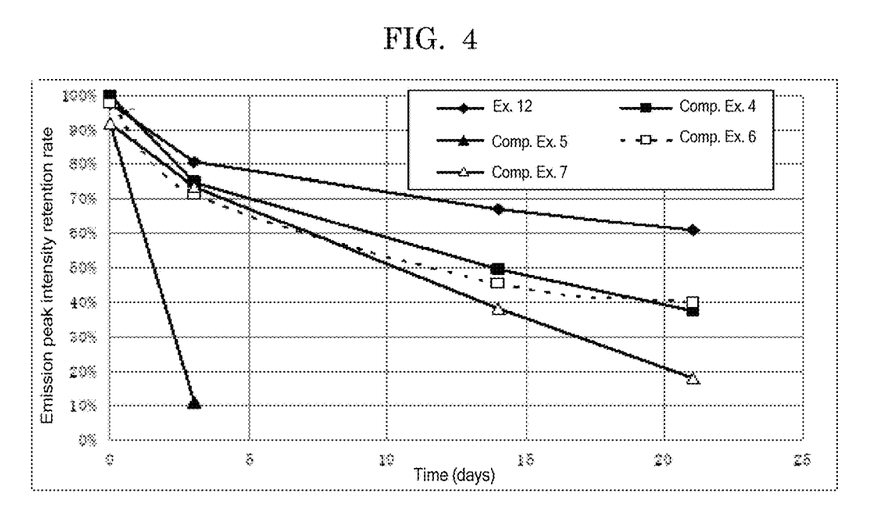
FIG. 4 is a diagram depicting a comparison between the results of Example 12 and Comparative Examples 4 to 7, in order to demonstrate a change in the emission peak intensity with time.

The obtained results are presented in the following table 7, and FIG. 4.

Comparative Example 4

Emission peak intensity retention rates of a fluorescent substance were determined in Environmental Tests (A) and (B) in the same manner as in Example 12, provided that a fluorescent substance (no coating process) obtained in Example 3, in which no coating process was performed, was used. The results are presented in Tables 6 and 7, and FIG. 4.

Comparative Example 5

A plastic container with a cap was charged with 10 g of a fluorine-based solution (Novec 7200, manufactured by 3M), and 2 g of the fluorescent substance obtained in Example 3, and the resulting mixture was dispersed by a vibration mixer for 5 minutes. Subsequently, the resulting dispersion liquid was stirred by a mix rotor for 1 hour. After the stirring, a powder was collected by vacuum filtration, and the collected powder was dried overnight, to thereby obtain a fluorescent substance in contact with a solvent.

Environmental Tests (A) and (B) were performed in the same manner as Example 12, provided that the fluorescent substance obtained above was used. From the tests, emission peak intensity retention rates of the fluorescent substance were determined. The results are presented in Tables 6 and 7, and FIG. 4.

Comparative Example 6

A plastic container with a cap was charged with 10 g of a fluorine-based solution (Novec 7200, manufactured by 3M), and 2 g of the fluorescent substance obtained in Example 3, and the resulting mixture was dispersed by a vibration mixer for 5 minutes. Subsequently, the resulting dispersion liquid was stirred by a mix rotor for 1 hour. After the stirring, a powder was collected by vacuum filtration, and the collected powder was dried at 80° C. for 1 hour, to thereby obtain a fluorescent substance in contact with a solvent.

Environmental Tests (A) and (B) were performed in the same manner as Example 12, provided that the fluorescent substance obtained above was used. From the tests, emission peak intensity retention rates of the fluorescent substance were determined. The results are presented in Tables 6 and 7, and FIG. 4.

Comparative Example 7

A plastic container with a cap was charged with 0.2 g of silica particles (Aerosil 200, manufactured by Toshin Chemicals Co., Ltd.), and 10 g of a fluorine-based solution (Novec 7200, manufactured by 3M), and the resulting mixture was dispersed by ultrasonic waves. To the resultant, 2 g of the fluorescent substance obtained in Example 3 was added, and the mixture was dispersed by a vibration mixer for 5 minutes. Subsequently, the resulting dispersion liquid was stirred by a mix rotor for 1 hour. After the stirring, a powder was collected by vacuum filtration, and the collected powder was dried at 80° C. for 1 hour, to thereby obtain a fluorescent substance to which silica particles were adsorbed.

Environmental Tests (A) and (B) were performed in the same manner as Example 12, provided that the fluorescent substance obtained above was used. From the tests, emission peak intensity retention rates of the fluorescent substance were determined. The results are presented in Tables 6 and 7, and FIG. 4.

Comparison Between Example 12 and Comparative Examples 4 to 7

In the storage test in the desiccator environment (20° C., 5% RH), Comparative Example 4 using the fluorescent substance, to which the coating process had not been performed, had results that the emission peak intensity deteriorated less, and the storage stability was excellent compared to others, i.e., Example 12 and Comparative Examples 5 to 7 (see the results in Table 6). It was assumed that the results of Example 12 and other comparative examples were poor compared to Comparative Example 4, because the deterioration of the fluorescent substance was accelerated, as the solvent was remained. However, it could be seen that the surface-coated fluorescent substance of Example 12 maintained excellent emission peak intensity even after the 1-week storage, through it was slightly poor compared to the result of the fluorescent substance of Comparative Example 4.

Moreover, in the storage test in the glove box environment (20° C., 20% RH), notable deterioration of the fluorescent substance of Comparative Example 4 was caused, and the value of the emission peak intensity was significantly poor after the storage of 3 days or longer (see the results in Table 7). On the other hand, the surface-coated fluorescent substance of Example 12 could prevent deterioration of the emission peak intensity over a long period.

Comprehensively judging the results of Environmental Tests (A) and (B), therefore, it was found that Example 12 was the most preferable, and coating a surface of the fluorescent substance with a fluororesin was effective in preventing deterioration of the emission peak intensity.

As described above, it was confirmed from the results of Example 12 that the surface-coated fluorescent substance of the present invention, surface of which was coated with a fluororesin, had excellent moisture resistance, could present deteriorations in emission properties, and could maintain excellent emission properties for a long period.

TABLE 6

|  | Ex. 12 | Comp. Ex. 4 | Comp. Ex. 5 | Comp. Ex. 6 | Comp. Ex. 7 |
|---|---|---|---|---|---|
| Coating | Fluororesin | — | — | — | Silica particles |
| Drying conditions | 80° C., 1 hour | — | Natural drying, overnight | 80° C., 1 hour | 80° C., 1 hour |
| Emission peak intensity retention rate (%) before storage | 98 | 100 | 92 | 98 | 92 |
| Emission peak intensity retention rate (%) after 1-week storage | 95 | 97 | 14 | 94 | 88 |

TABLE 7

|  | Storage days | Ex. 12 | Comp. Ex. 4 | Comp. Ex. 5 | Comp. Ex. 6 | Comp. Ex. 7 |
|---|---|---|---|---|---|---|
| Emission peak intensity retention rate (%) | 0 days | 98 | 100 | 92 | 98 | 92 |
|  | 3 days | 81 | 75 | 11 | 71 | 74 |
|  | 14 days | 67 | 49 |  | 45 | 38 |
|  | 21 days | 61 | 37 |  | 40 | 18 |

This application claims priority to Japanese application No. 2014-154149, filed on Jul. 29, 2014 and incorporated herein by reference, and Japanese application No. 2014-253679, filed on Dec. 16, 2014 and incorporated herein by reference.

What is claimed is:

1. A fluorescent substance, represented by the following general formula (1):

$$Ca_{1-x}(Se_yS_{1-y}):Eu_x \qquad (1)$$

where y is a value in the range of 0.5 to 1 and x=0.0001 to 0.1, wherein an absolute value of a difference between an optimal value (nm) of an emission peak wavelength corresponding to the value of y, and a measured value (nm) of the emission peak wavelength is 5 nm or less, and wherein an absolute value of a difference between an optimal value (nm) of a full width at half maximum of emission corresponding to the value of y, and a measured value (nm) of the full width at half maximum of emission is 6 nm or less.

2. The fluorescent substance according to claim 1, wherein internal quantum efficiency of the fluorescent substance is 45% or greater.

3. The fluorescent substance according to claim 1, wherein the fluorescent substance represented by the general formula (1) is europium-containing calcium selenide sulfide, where y is 0.5 or greater but less than 1, and the europium-containing calcium selenide sulfide is produced by mixing calcium selenide, calcium sulfite•europium, and ammonium chloride, and firing a mixture thereof.

4. The fluorescent substance according to claim 1, wherein the fluorescent substance represented by the general formula (1) is europium-containing calcium selenide, where y is 1, and the europium-containing calcium selenide is produced by mixing calcium selenide, europium oxide, and ammonium chloride, and firing the mixture.

5. A surface-coated fluorescent substance, comprising:
the fluorescent substance according to claim 1; and
a fluororesin coating a surface of the fluorescent substance.

6. A fluorescent substance, comprising:
europium-containing calcium selenide sulfide, represented by the following general formula (2):

$$Ca_{1-x}(Se_yS_{1-y}):Eu_x \quad (2)$$

where y is a value in the range of 0.5 or greater but less than 1 and x=0.0001 to 0.1,
wherein the fluorescent substance is produced by mixing calcium selenide, calcium sulfite•europium, and ammonium chloride, and firing a mixture thereof.

7. A fluorescent substance, comprising:
europium-containing calcium selenide, represented by the following general formula (3):

$$Ca_{1-x}Se:Eu_x \quad (3)$$

wherein x=0.0001 to 0.1 and the fluorescent substance is produced by mixing calcium selenide, europium oxide, and ammonium chloride, and firing a mixture thereof.

8. A production method of a fluorescent substance, comprising:
mixing calcium selenide, calcium sulfite•europium, and ammonium chloride, and firing a mixture thereof, to thereby produce a fluorescent substance composed of europium-containing calcium selenide sulfide represented by the following general formula (2):

$$Ca_{1-x}(Se_yS_{1-y}):Eu_x \quad (2)$$

where y is a value in the range of 0.5 or greater but less than 1 and x=0.0001 to 0.1.

9. A production method of a fluorescent substance, comprising:
mixing calcium selenide, europium oxide, and ammonium chloride, and firing a mixture thereof, to thereby produce a fluorescent substance composed of europium-containing calcium selenide represented by the following general formula (3):

$$Ca_{1-x}Se:Eu_x \quad (3)$$

where x=0.0001 to 0.1.

10. The production method according to claim 8, wherein an atmosphere for the firing is a reducing atmosphere.

11. The production method according to claim 10, wherein the atmosphere for the firing is a 4% hydrogen-containing nitrogen atmosphere.

12. The production method according to claim 8, wherein an amount of the ammonium chloride is 5% by mass to 40% by mass relative to a total mass of the calcium selenide and the calcium sulfite•europium.

13. The production method according to claim 9, wherein an atmosphere for the firing is a reducing atmosphere.

14. The production method according to claim 13, wherein the atmosphere for the firing is a 4% hydrogen-containing nitrogen atmosphere.

15. The production method according to claim 9, wherein an amount of the ammonium chloride is 5% by mass to 40% by mass relative to a total mass of the calcium selenide and the europium oxide.

16. A production method of a surface-coated fluorescent substance, comprising:
coating a surface of the following fluorescent substance (I) or (II) with a fluororesin in a non-aqueous atmosphere:
(I) a fluorescent substance composed of europium-containing calcium selenide sulfide represented by the following general formula (2), which is produced by a method containing mixing calcium selenide, calcium sulfite•europium, and ammonium chloride, and firing a mixture thereof, $$Ca_{1-x}(Se_yS_{1-y}):Eu_x \quad (2)$$

where y is a value in the range of 0.5 or greater but less than 1 and x=0.0001 to 0.1; and
(II) a fluorescent substance composed of europium-containing calcium selenide represented by the following general formula (3), which is produced by a method containing mixing calcium selenide, europium oxide, and ammonium chloride, and firing a mixture thereof $$Ca_{1-x}Se:Eu_x \quad (3)$$

where x=0.0001 to 0.1.

* * * * *